July 23, 1957
H. J. HALL
2,800,191
SPARKING RATE METER
Filed April 6, 1955
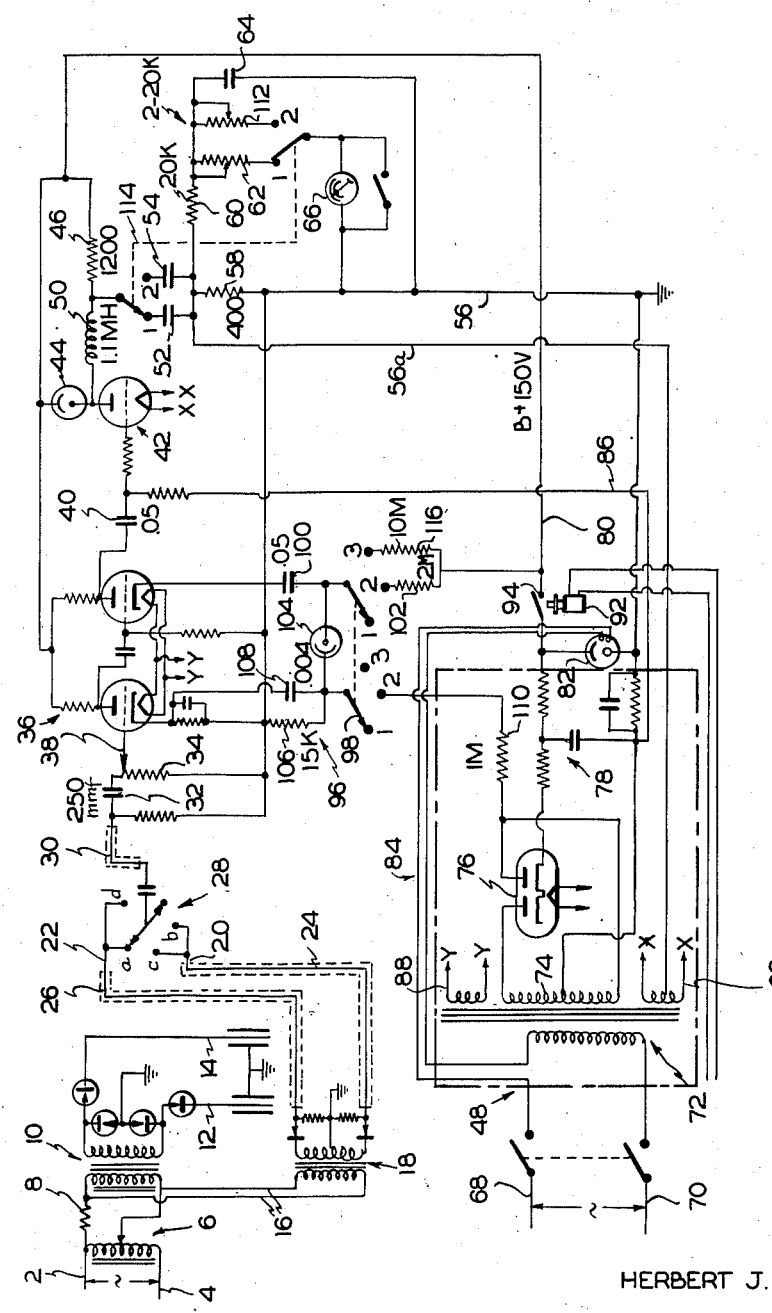
INVENTOR
HERBERT J. HALL
BY *Harold T. Stowell*
ATTORNEY 2,800,191

SPARKING RATE METER

Herbert J. Hall, Princeton, N. J., assignor to Research Corporation, New York, N. Y., a corporation of New York Application April 6, 1955, Serial No. 499,706

5 Claims. (Cl. 183—7)

This invention relates to a spark rate indicator for electrostatic precipitators and has for its primary object the provision of such an indicator which is capable of giving a continuous indication of the sparking rate of an electrostatic precipitator, which is simple and easy to use and can readily be made small enough to be portable, so that it can be carried from one installation to another by maintenance and testing personnel.

U. S. Patent No. 2,675,092 to H. J. Hall shows a system for controlling the energization of electrostatic precipitators in accordance with the sparking rate and is provided with a meter to indicate the sparking rate. However, this system is fixed and the meter circuit is not adapted to a portable design for use by testing and maintenance personnel in routine or emergency checking of precipitator systems. For rapid diagnosis of troubles, for setting optimum electric conditions for maximum efficiency, and for various test purposes in electrical precipitators which are not equipped with electronic automatic voltage control, there is need for a general purpose, small, light weight, portable instrument having direct indication of precipitator average sparking rate on a meter. It is an object of the invention to provide such an instrument, and it is a further object to provide in such an instrument built-in rate calibrator which can be used with any commercial 60-cycle supply source as a frequency reference to provide accurate calibration each time the instrument is used.

A further object is to provide a spark rate indicating system which can be made sufficiently small in size and light in weight to be suitable for field use.

The specific nature of the invention, as well as other objects and advantages thereof, will clearly appear from a description of a preferred embodiment as shown in the accompanying drawing in which the single figure is a circuit diagram of the invention.

For the purpose of illustration, the invention is shown used in a precipitator having two sections, each connected for half-wave energization. Power for the precipitator may be supplied typically from a commercial alternating current source through lines 2, 4. Voltage control means are represented by the adjustable autotransformer 6, and the conventional ballast resistor is shown at 8. High tension transformer 10 steps up the voltage to a suitable value for precipitation, usually in the order of 60,000 volts, and this voltage is supplied to the discharge electrodes 12, 14, of a two-section precipitator through any known type of double half-wave rectification system. It will be understood that the precipitator shown is illustrative and the invention may be used with any type of industrial precipitator. The present invention resides in the portable testing system which is shown used with the precipitator for measuring the sparking rate, and which will now be described.

Inter-electrode sparking is detected by known means, e. g., primary pick-up leads 16 and spark-sensing circuit 18, which may be of the type shown in my co-pending application Ser. No. 414,003, filed March 4, 1954, now Patent No. 2,752,000 dated June 26, 1956. It will be understood that any other detecting means may be employed such as a high-voltage resistance divider, or the capacity pick-up in U. S. Patent No. 2,666,496 to R. E. Willison. With the usual negative polarity on the precipitator discharge electrodes 12, 14, a precipitator spark produces a positive transient pulse from the spark sensing circuit 18. This voltage pulse is fed to the measuring device for measuring the pulse rate. Switch 28 is provided with three positions: In the first position, a sparking impulse from electrode 14 is connected to the measuring circuit through contact $a$; in the next position, contact $b$ in effect connects electrode 12 to the measuring circuit; and in the last position, contacts $c$ and $d$ connect both sections simultaneously for measurement of the total spark rate of both sections of the precipitator, as fully explained in the above referred to co-pending application.

Shielded cable 30 conducts the voltage pulses through coupling capacitor 32 to potentiometer 34. Coupling capacitor 32 is made sufficiently small so as not to pass the ordinary 60-cycle (or 120-cycle rectified voltage pulses normally present on the precipitator high tension electrodes) of the power line system, but will pass the short, steep sparking pulses which are used to trigger the thyratron, as will be described below.

Amplifier 36 is supplied with pulses from the adjustable tap 38 of potentiometer 34 whereby the voltage pulse amplitude may be adjusted to a suitable value. Amplifier 36 may be a two-stage amplifier of any suitable design, and its output is coupled by condenser 40 to the control grid of thyratron 42. A neon flash tube 44 is inserted in the plate circuit of the thyratron as shown to provide an operation indicator; this tube flashes when the gain control potentiometer 34 has advanced sufficiently to provide the proper signal strength to fire the thyratron 42. In practice, the gain control is adjusted slightly above this threshold signal level, so that the indicator flashes each time a spark occurs. Thyratron 42 is preferably gas-filled, e. g., xenon, which renders operation insensitive to ambient temperature over a wide range. The thyratron plate is supplied through resistor 46 from the constant voltage output of the direct current power supply 48, which will be described below; the plate is connected through inductance 50 to condenser 52. The plate supply is also connected through resistor 46 to condenser 52. The grounded or negative side of the direct current power supply is connected through ground lead 56 to a network consisting of resistors 58, 60, 62, condenser 64, and current meter 66 to the other side of condenser 52 or 54. Lead 56$a$ connects condenser 52 (or 54) to the thyratron filament center-tap.

The regulated direct current power supply 48 is supplied on lines 68, 70, typically from any commercial 60-cycle alternating current source. Transformer 72 has a high voltage (700 volts center-tapped) secondary winding 74, the output of which is rectified by rectifier 76 and supplied through a filter 78 to lead 80. Regulator tube 82, typically type VR-150, is employed to provide a constant direct current supply. Two pins on the regulator tube (e. g., pins 3 and 7) are internally connected and the primary circuit is closed through this connection by leads 84, so that if the regulator tube is removed, the circuit is open, thus insuring that the direct current power supply cannot be used without the regulator tube in place. A negative bias supply is provided from the secondary winding 74 (typically 43 volts) on lead 86, for thyratron 42. Two low voltage filament windings 88 and 90 are provided for filament heating. Winding 88 energizes the heaters of rectifier tube 76 and of the tubes of amplifier 36. Winding 90 energizes the filament of thyratron 42.

In the primary circuit there is also a time delay relay 92 which closes contacts 94 in the secondary circuit of the rectified direct current supply, after a sufficient delay to insure proper heating of the filament thyratron 42 before applying anode voltage. The sparking rate meter 66 is a double scale ammeter with two scales, preferably calibrated in sparks per minute—typically 0–500 and 0–2,500 sparks per minute—and with separate external calibrating resistors, 62 for the low range scale and 112 for the high range scale.

A particularly novel and useful feature of this system is the rate calibrating circuit generally indicated at 96. This is essentially a relaxation oscillator synchronized from 60-cycle alternating current supply line. The relaxation oscillator circuit comprises the following elements: Neon tube 104, charging resistors 102 and 116 for high and low test frequencies, pulse capacitor 100 for the storage of energy, discharge resistor 106 to control current flow from capacitor 100 through tube 104, coupling resistor 110 to obtain synchronizing pulse from A. C. winding 74, coupling capacitor 108 to supply test frequency from the oscillator circuit to the spark rate amplifier circuit of the spark-rate indicator, and control switch 98 having three positions. In position 1 the oscillator is Off, in position 2 the oscillator is On and synchronized at, for example, 1800 cycles per minute; and in position 3 the oscillator is On and "free-running" at, for example, approximately 360 cycles per minute. With switch 98 in position 2, condenser 100 is charged from the 150-volt direct current supply line through resistor 102. When the voltage across condenser 100 reaches the ignition potential of the neon tube 104, the tube conducts and discharges the condenser through resistor 106. The voltage pulse thus produced across resistor 106 is coupled through condenser 108 to the countercircuit as shown. The discharge frequency is adjusted by the time constant of resistor 102 and condenser 100 in the well-known manner. For the values shown in the drawings, the natural frequency of the oscillator is about 1800 per minute. (All condenser values are in microfarads unless otherwise noted.) By coupling one terminal of the power transformer secondary through resistor 110 to the junction of condenser 108 and resistor 106 as shown, the frequency is accurately synchronized with the 60-cycle line at 1800 per minute. The high range scale of the sparking rate meter can now be calibrated by setting switch 114 at position 2 to connect condenser 54 and resistor 112 into the meter circuit and suitably adjusting resistor 112. To calibrate the low scale, the calibrator switch 98 is turned to position 3. The natural frequency of the relaxation oscillator is now about 350 per minute determined by the particular values of condenser 100, resistor 116 and the characteristics of the neon tube 104. The actual rate is determined by reading the meter. Then switch 114 is turned to position 1 and the reading on the low scale is set to this value by adjusting potentiometer 62. It is clear that the low scale calibration is based on initial calibration at 1800 per minute and hence the next frequency used for the second calibration is unimportant as long as it is conveniently within the scale limits, typically somewhere between one-half and full scale.

When the power supply is turned on, condenser 52 becomes charged to 150 volts, which voltage also appears across inductance 50 and thyratron 42, which is normally held non-conductive by the negative direct-current bias on lead 86. When the precipitator sparks, the transient voltages from pick-up 16 (and/or 18) is amplified by amplifier 36 to provide a positive pulse of sufficient amplitude to overcome this negative bias on the thyratron grid and thereby cause thyratron 42 to conduct and condenser 52 to discharge through inductance 50 and the thyratron. After the discharge, the thyratron quickly becomes non-conducting again and condenser 52 is recharged as before. Inductance 50 limits the peak discharge current through the thyratron to a safe value and also causes the voltage to cross 52 to reverse polarity by the end of the discharge to assist in rapidly deionizing the tube so that it becomes non-conducting until another spark occurs. Thus, for each spark in the precipitator, a certain fixed electric charge is transferred from the current source to condenser 52. This charge, multiplied by the average number of sparks during any second, is the average condenser charging current which is indicated by meter 66. The network 58, 60, 62, 64, 66, constitutes a resistance-capacitance integrating circuit which smooths out the individual current pulses charging condenser 52 so that a steady indication on meter 66 is obtained. Meter 66 is a microammeter so that only a small portion of the total current is required, thereby permitting resistors 60 and 62 to be large compared to 58 and a long integrating time of several minutes may be thus obtained with a reasonable size capacitor 64. For convenience, meter 66 can be calibrated directly in average sparks per minute. Meter 66 is thus used as a continuous indicator of average sparking rate. The second condenser 54 and the second resistor 112 may be put into the circuit by switch 114 to change the scale, thus extending the frequency range of the instrument.

It will be apparent that the embodiment shown is only exemplary and that various modifications can be made in construction and arrangement within the scope of my invention as defined in the appended claims.

I claim:

1. In combination with the electrodes of an electrostatic precipitator, spark responsive means for producing a sharp voltage pulse on each occurrence of an interelectrode sparking event, measuring and indicating circuit means responsive to the effect of said voltage pulses for indicating an integrated sparking rate, a calibrating circuit for said indicating circuit comprising rectifier and circuit means for producing unidirectional pulses from a standard alternating current source at a reference frequency determined by the source frequency, a discharge circuit triggered by said unidirectional pulses for producing sharp pulses at said reference frequency, and circuit elements for supplying said sharp pulses to said measuring and indicating circuit for calibrating a scale of said last circuit.

2. The invention according to claim 1, said measuring and indicating circuit comprising a second scale for measuring pulse rates of a different order from the first said scale, said scales having a region of overlap, said rectifier means comprising a filter circuit for producing a constant direct-current voltage, a relaxation oscillator circuit supplied by said last voltage for producing voltage pulses at an arbitrary rate in said region of overlap, whereby said rate can be measured on the first scale, and independent means for calibrating said second scale by the voltage pulses at said arbitrary rate.

3. In combination with the electrodes of an electrostatic precipitator, spark responsive means for producing a sharp voltage pulse on each occurrence of an interelectrode sparking event, adjustable amplifier means for amplifying said voltage pulses, a thyratron normally biased to cut off, circuit means for supplying said voltage pulses to the grid of said thyratron to trigger a discharge of said thyratron; a power supply comprising means for connection to a standard alternating current power source, rectifier means for producing unidirectional pulses from said source at a reference frequency determined by the source frequency, and filter means for producing a constant direct current voltage from said unidirectional pulses; a measuring and indicating circuit comprising a first capacity-resistance integrating circuit connected to said thyratron, and to said constant direct current voltage source, so as to be charged by said source and discharged by said thyratron when the thyratron is triggered, a meter in said integrating circuit for measuring the integrated current thereof as an indication of the integrated sparking rate of said precipitator electrodes; and a calibrating circuit for the meter circuit comprising a discharge circuit triggered by said unidirectional pulses from said source to provide sharp pulses at said reference frequency, circuit elements for supplying said sharp pulses to said integrating and measuring circuit for calibrating said circuit.

4. The invention according to claim 3, said discharge circuit comprising a relaxation oscillator circuit triggered by said pulses.

5. The invention according to claim 4, said measuring and indicating circuit comprising two scales for measuring pulse rates of different orders, said scales having a region of overlap; a relaxation oscillator circuit supplied by said constant direct current voltage for producing voltage pulses at an arbitrary rate in said region of overlap, and means for supplying said arbitrary pulses to said integrating and measuring circuit for calibrating one of said scales with reference to the other.

References Cited in the file of this patent

UNITED STATES PATENTS

| | | |
|---|---|---|
| 2,666,496 | Willison | Jan. 19, 1954 |
| 2,675,092 | Hall | Apr. 13, 1954 |